United States Patent
Tateda (10) Patent No.: US 10,090,795 B2
(45) Date of Patent: Oct. 2, 2018

(54) MOTOR DRIVE HAVING FUNCTION OF PROTECTING DYNAMIC BRAKING CIRCUIT

(71) Applicant: FANUC CORPORATION, Yamanashi (JP)

(72) Inventor: Masaya Tateda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/441,809

(22) Filed: Feb. 24, 2017

(65) Prior Publication Data

US 2017/0250645 A1   Aug. 31, 2017

(30) Foreign Application Priority Data

Feb. 26, 2016   (JP) .................................. 2016-036016

(51) Int. Cl.
*H02P 29/032*   (2016.01)
*H02P 27/06*   (2006.01)
*H02P 6/24*   (2006.01)

(52) U.S. Cl.
CPC .............. *H02P 29/032* (2016.02); *H02P 6/24* (2013.01); *H02P 27/06* (2013.01)

(58) Field of Classification Search
CPC ........... H02P 29/032; H02P 6/24; H02P 27/06
USPC ........................................................ 318/465
See application file for complete search history.

(56) References Cited

U.S. PATENT DOCUMENTS

2011/0276260 A1* 11/2011 Sim ...................... B60R 16/0236
  701/123
2013/0221888 A1*  8/2013 Horikoshi ................. H02P 3/22
  318/400.29
2013/0342143 A1* 12/2013 Sonoda ..................... H02P 6/08
  318/400.21

FOREIGN PATENT DOCUMENTS

| JP | 10341582 A | * 12/1998 |
| JP | A-2002-369564 | 12/2002 |
| JP | 2007174729 A | * 7/2007 |
| JP | A-2011-062035 | 3/2011 |
| JP | A-2013-179741 | 9/2013 |

* cited by examiner

*Primary Examiner* — Kawing Chan
(74) *Attorney, Agent, or Firm* — RatnerPrestia (57) ABSTRACT

A motor drive according to the present invention includes an inverter, a motor rotational speed obtaining unit, a motor inertia information storage unit, a motor rotational energy calculator, a dynamic braking circuit, a tolerance information storage unit for storing the tolerances of resistors of the dynamic braking circuit, a power element operation unit, a dynamic braking circuit operation unit, and a tolerance comparator for performing a comparison between the rotational energy of a motor and the tolerance of the dynamic braking circuit. When the rotational energy exceeds the tolerance, power elements of one of arms are turned on, while power elements of the other arm are turned off, without actuating the dynamic braking circuit. When the rotational energy is equal to or less than the tolerance, the dynamic braking circuit is actuated, and the power elements of the one of the arms are turned off.

3 Claims, 6 Drawing Sheets

MOTOR DRIVE HAVING FUNCTION OF PROTECTING DYNAMIC BRAKING CIRCUIT

This application is a new U.S. patent application that claims benefit of JP 2016-036016 filed on Feb. 26, 2016, the content of 2016-036016 is incorporated herein by reference.

BACKGROUND OF THE INVENTION

1. Field of the Invention

The present invention relates to a motor drive, and more specifically relates to a motor drive having the function of protecting a dynamic braking circuit to be actuated in case of an emergency stop of a motor.

2. Description of Related Art

In motor drives for driving synchronous motors for feed axes of machine tools and industrial machines, industrial robots, and the like, dynamic braking circuits are widely used in inverter units, for the purpose of shortening stopping distances in case of emergency stops of the motors. The dynamic braking circuit includes resistors for converting rotational energy of the motor into heat, and switches for activating the circuit. The dynamic braking circuit is activated whenever an emergency stop occurs. The resistors used in the dynamic braking circuit have limited tolerances. However, when the driven motor has a high load inertia or is operated at a high speed, the rotational energy of the motor may exceed the tolerances of the resistors of the dynamic braking circuit. In such a case, it is necessary to reduce the rotational speed of the motor, or add a device to protect the dynamic braking circuit.

Various methods for protecting a dynamic braking circuit have been reported so far. For example, a temperature detector is provided in resistors of a dynamic braking circuit. Upon detecting extraordinary heat generation, the dynamic braking circuit is switched off (for example, Japanese Unexamined Patent Publication (Kokai) No. 2011-062035). According to this method, even in an abnormal condition, that is, in continued use of the dynamic braking circuit, the temperature detector detects the heat generation in the resistors of the dynamic braking circuit and interrupts a current flow through the resistors of the dynamic braking circuit. This serves to prevent damage to peripheral circuits due to the extraordinary heat generation. However, this conventional technique requires the addition of the temperature detector.

Also, a method in which consumed energy is calculated from two values, that is, the rotational speed of a motor at the time of starting application of a dynamic brake and an elapsed time between the start and the end of application of the dynamic brake, to determine whether or not to actuate a dynamic braking circuit is reported (for example, Japanese Unexamined Patent Publication (Kokai) No. 2002-369564). This method allows easily calculating how much stored energy has been consumed in the dynamic braking circuit during the application of the dynamic brake, thus reliably performing a protection operation without adding any specific detector to the dynamic braking circuit. However, in this conventional technique, whether or not to actuate the dynamic brake can be determined only after a lapse of predetermined time from a time when the dynamic brake is intended to be actuated.

Also, a method in which in case of an emergency stop, power elements are turned on in one of upper and lower arms of an inverter, and turned off after the completion of switching of a dynamic braking circuit is reported (for example, Japanese Unexamined Patent Publication (Kokai) No. 2013-179741). This method allows an increase in the life of mechanical contact components that are used for shorting windings of a synchronous motor to apply a dynamic brake, a reduction in a braking time of the dynamic brake, and also the provision of a motor drive having a simple configuration at a low cost. Although this method aims at protecting contacts of switches of the dynamic braking circuit, this method does not consider the tolerances of resistors used in the dynamic braking circuit.

SUMMARY OF THE INVENTION

The present invention aims at providing a motor drive that determines whether or not to actuate a dynamic brake by a comparison between rotational energy calculated from the rotational speed of a motor and the tolerances of resistors of a dynamic braking circuit, in order to prevent damage to the dynamic braking circuit.

A motor drive according to an embodiment of the present invention includes an inverter including power elements constituting an upper arm and a lower arm, for converting a direct current (DC) voltage into an alternating current (AC) voltage to drive a motor by switching of the power elements; a rotational speed obtaining unit for obtaining the rotational speed of the motor during operation of the motor; an inertia information storage unit for storing information about the inertia of the motor; a rotational energy calculator for calculating the rotational energy of the motor based on the obtained rotational speed of the motor and the inertia of the motor; a dynamic braking circuit including switches for shorting a plurality of windings provided in the motor through resistors, for generating a deceleration torque by dynamic braking of the motor in case of an emergency stop of the motor; a tolerance information storage unit for storing information about the tolerances of the resistors of the dynamic braking circuit; a power element operation unit for turning on the power elements of one of the upper and lower arms, while turning off the power elements of the other arm in the emergency stop of the motor; a dynamic braking circuit operation unit for operating the switches of the dynamic braking circuit; and a tolerance comparator for performing a comparison between the calculated rotational energy of the motor and the tolerance of the dynamic braking circuit. When the rotational energy of the motor exceeds the tolerance of the dynamic braking circuit, the dynamic braking circuit operation unit turns on the power elements of one of the upper and lower arms, while turning off the power elements of the other arm, without actuating the dynamic braking circuit. When the rotational energy of the motor is equal to or less than the tolerance of the dynamic braking circuit, the dynamic braking circuit operation unit actuates the dynamic braking circuit, and the power element operation unit turns off the power elements of the one of the upper and lower arms.

BRIEF DESCRIPTION OF THE DRAWINGS

The objects, features, and advantages of the present invention will be more apparent from the following description of an embodiment in conjunction with the attached drawings, wherein.

DETAILED DESCRIPTION OF THE INVENTION

A motor drive according to the present invention will be described below with reference to the drawings.

Figure 1:
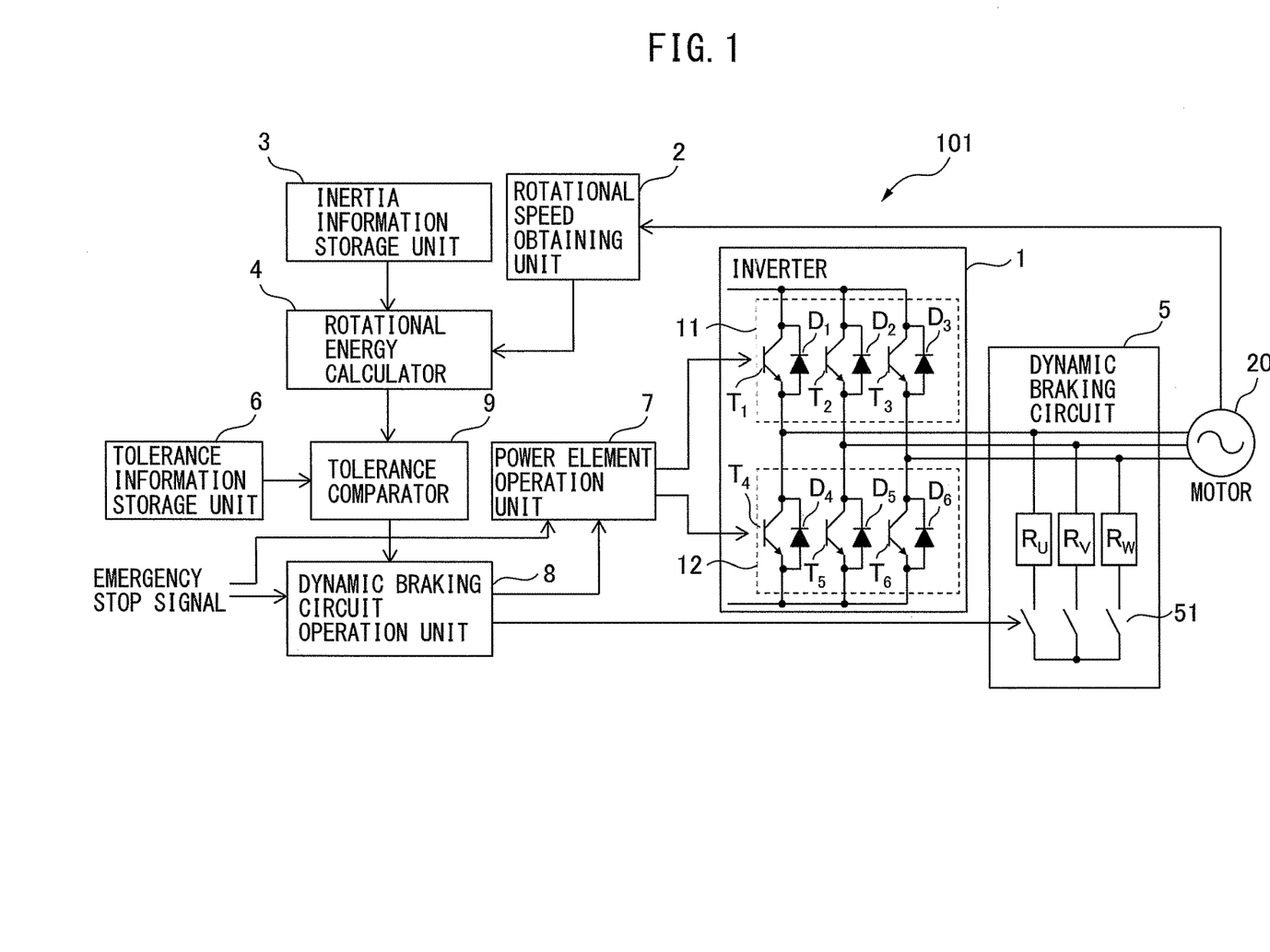
FIG. 1 is a block diagram of a motor drive according to an embodiment of the present invention.

A motor drive according to an embodiment of the present invention will be described with reference to the drawings. FIG. 1 is a block diagram of the motor drive according to the embodiment of the present invention. A motor drive 101 according to the embodiment of the present invention includes an inverter 1, a rotational speed obtaining unit 2, an inertia information storage unit 3, a rotational energy calculator 4, a dynamic braking circuit 5, a tolerance information storage unit 6, a power element operation unit 7, a dynamic braking circuit operation unit 8, and a tolerance comparator 9. In the motor drive 101 according to the embodiment of the present invention, when the rotational energy of a motor 20 exceeds the tolerance of the dynamic braking circuit 5, the dynamic braking circuit operation unit 8 does not actuate the dynamic braking circuit 5, and the power element operation unit 7 turns on power elements of one of an upper arm 11 and a lower arm 12, while turning off power elements of the other arm. When the rotational energy of the motor 20 is equal to or less than the tolerance of the dynamic braking circuit 5, the dynamic braking circuit operation unit 8 actuates the dynamic braking circuit 5, and the power element operation unit 7 turns off the power elements of the one of the arms.

The inverter 1 includes the upper arm 11 and the lower arm 12, which are constituted of the power elements ($T_1$ to $T_3$ and $T_4$ to $T_6$), respectively. The inverter 1 converts a direct current (DC) voltage into an alternating current (AC) voltage to drive the motor 20 by switching of the power elements. To obtain the DC voltage to be supplied to the inverter 1, for example, an AC voltage supplied from an AC power source (not shown) is converted into the DC voltage by a rectifier, and the DC voltage is smoothed by a smoothing capacitor. This embodiment describes a three-phase inverter, as an example of the inverter 1. As the six power elements $T_1$ to $T_6$, for example, IGBTs (Insulated Gate Bipolar Transistors) are usable. Reflux diodes $D_1$ to $D_6$ are provided in anti-parallel with the power elements $T_1$ to $T_6$, respectively. $T_1$ is a U-phase upper arm power element, and $T_4$ is a U-phase lower arm power element. $T_2$ is a V-phase upper arm power element, and $T_5$ is a V-phase lower arm power element. $T_3$ is a W-phase upper arm power element, and $T_6$ is a W-phase lower arm power element. Thus, the power elements $T_1$, $T_2$, and $T_3$ constitute the upper arm 11, while the power elements $T_4$, $T_5$, and $T_6$ constitute the lower arm 12.

The rotational speed obtaining unit 2 obtains the rotational speed of the motor 20 during operation of the motor 20. The rotational speed of the motor 20 is detected using an encoder (not shown) disposed in the vicinity of the motor 20, or the like. The rotational speed obtaining unit 2 outputs the obtained rotational speed of the motor 20 to the rotational energy calculator 4.

The inertia information storage unit 3 stores information about the inertia of the motor 20. The inertia information storage unit 3 outputs the information about the inertia of the motor 20 to the rotational energy calculator 4.

The rotational energy calculator 4 calculates the rotational energy of the motor 20 based on the obtained rotational speed of the motor 20 and the information about the inertia of the motor 20. When $\omega(t)$ represents the rotational speed of the motor 20 and J represents the inertia of the motor 20, the rotational energy E of the motor 20 is calculated by the following equation:

$$E = \tfrac{1}{2} \times J \times \omega(t)^2 \qquad (1)$$

The rotational energy calculator 4 outputs the calculated rotational energy E of the motor 20 to the tolerance comparator 9.

The dynamic braking circuit 5 includes switches 51 to short a plurality of windings (see FIG. 4) provided in the motor 20 through resistors $R_U$, $R_V$, and $R_W$. In case of an emergency stop of the motor 20, the dynamic braking circuit 5 generates a deceleration torque by dynamic braking of the motor 20. By closing the switches 51, the windings of the motor 20 are shorted through the resistors $R_U$, $R_V$, and $R_W$. The rotational energy of the motor 20 is converted into Joule heat at the resistors $R_U$, $R_V$, and $R_W$, thus applying the dynamic braking.

The tolerance information storage unit 6 stores information about the tolerances of the resistors $R_U$, $R_V$, and $R_W$ of the dynamic braking circuit 5. Note that, in the description of this embodiment, "the tolerances of the resistors of the dynamic braking circuit" is also simply referred to as "the tolerance of the dynamic braking circuit". The tolerance information storage unit 6 outputs the values of the stored tolerances of the resistors $R_U$, $R_V$, and $R_W$ to the tolerance comparator 9.

In case of an emergency stop of the motor 20, the power element operation unit 7 turns on the power elements of one of the upper arm 11 and the lower arm 12, while turning off the power elements of the other arm. For example, when turning on the power elements of the upper arm 11, a drive signal is inputted to a gate of each of the power elements $T_1$, $T_2$, and $T_3$. On the other hand, when turning on the power elements of the lower arm 12, the drive signal is inputted to a gate of each of the power elements $T_4$, $T_5$, and $T_6$. In the emergency stop of the motor 20, the power element operation unit 7 receives an emergency stop signal from the outside.

The dynamic braking circuit operation unit 8 operates the switches 51 of the dynamic braking circuit 5. In the emergency stop of the motor 20, the dynamic braking circuit operation unit 8 also receives the emergency stop signal from the outside. The dynamic braking circuit operation unit 8 outputs a signal to operate the switches 51 of the dynamic braking circuit 5 not only to the dynamic braking circuit 5 but also to the power element operation unit 7. Thus, the power element operation unit 7 is informed of the operational state of the switches 51 of the dynamic braking circuit 5 by the dynamic braking circuit operation unit 8.

The tolerance comparator 9 performs a comparison between the rotational energy of the motor 20 obtained from the rotational energy calculator 4 and the tolerance of the dynamic braking circuit 5 obtained from the tolerance information storage unit 6. The tolerance comparator 9 outputs information about whether or not the calculated rotational energy of the motor 20 exceeds the tolerance of the dynamic braking circuit 5, to the dynamic braking circuit operation unit 8.

When the rotational energy of the motor 20 exceeds the tolerance of the dynamic braking circuit 5, the dynamic braking circuit operation unit 8 does not actuate the dynamic braking circuit 5, and the power element operation unit 7 turns on the power elements of one of the upper arm 11 and the lower arm 12 while turning off the power elements of the other arm. For example, the power element operation unit 7 turns on the power elements $T_4$, $T_5$, and $T_6$ of the lower arm 12, while turning off the power elements $T_1$, $T_2$, and $T_3$ of the upper arm 11. However, not limited thereto, the power element operation unit 7 may turn on the power elements $T_1$, $T_2$, and $T_3$ of the upper arm 11, while turning off the power elements $T_4$, $T_5$, and $T_6$ of the lower arm 12.

On the other hand, when the rotational energy of the motor 20 is equal to or less than the tolerance of the dynamic braking circuit 5, the dynamic braking circuit operation unit 8 actuates the dynamic braking circuit 5, and the power element operation unit 7 turns off the power elements $T_4$, $T_5$, and $T_6$ of the lower arm 12 that have been turned on.

Figure 2:
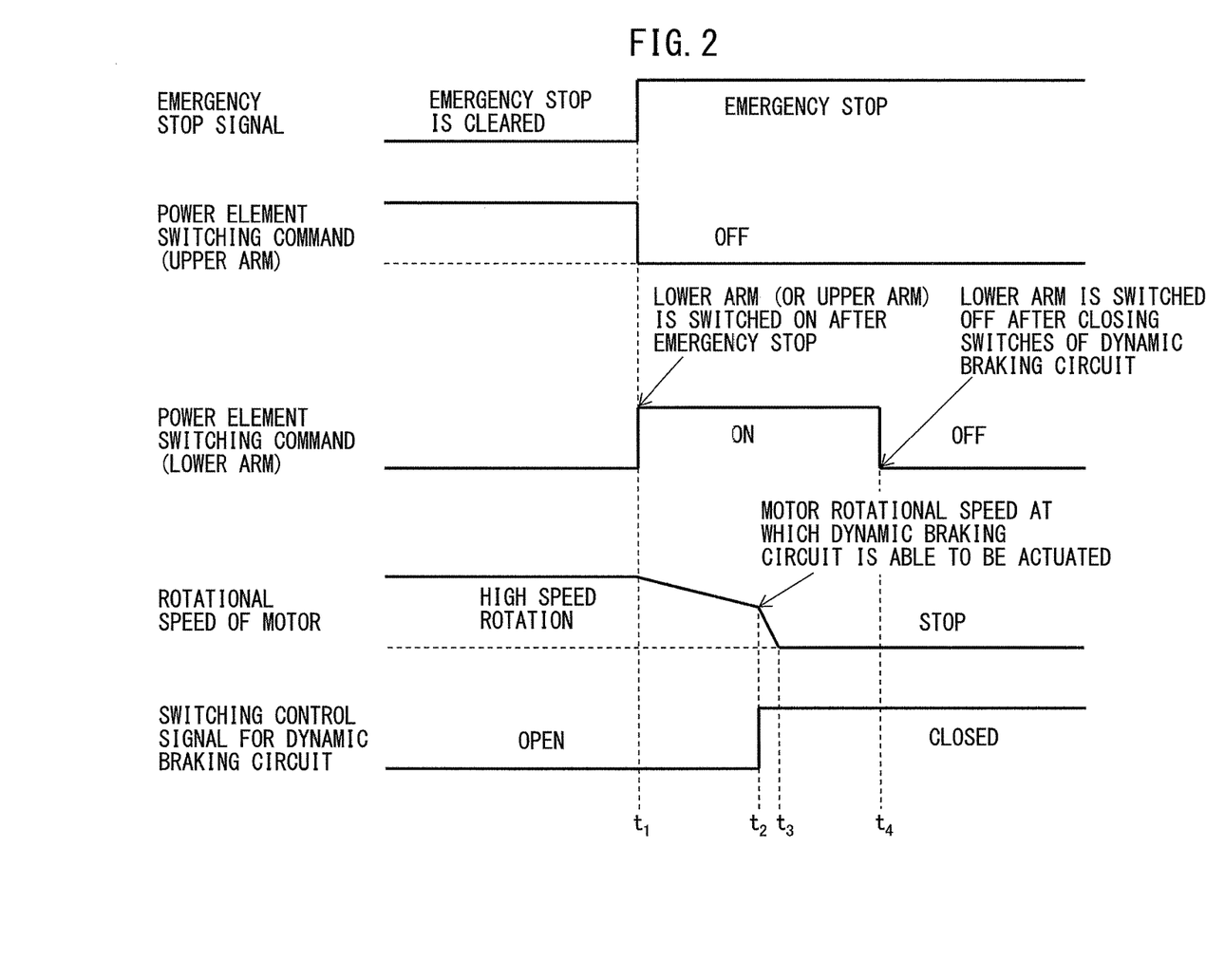
FIG. 2 is a timing chart showing variations with time in an emergency stop signal, power element switching commands for upper and lower arms, the rotational speed of a motor, and a switching control signal for a dynamic braking circuit in the motor drive according to the embodiment of the present invention.
Figure 3:
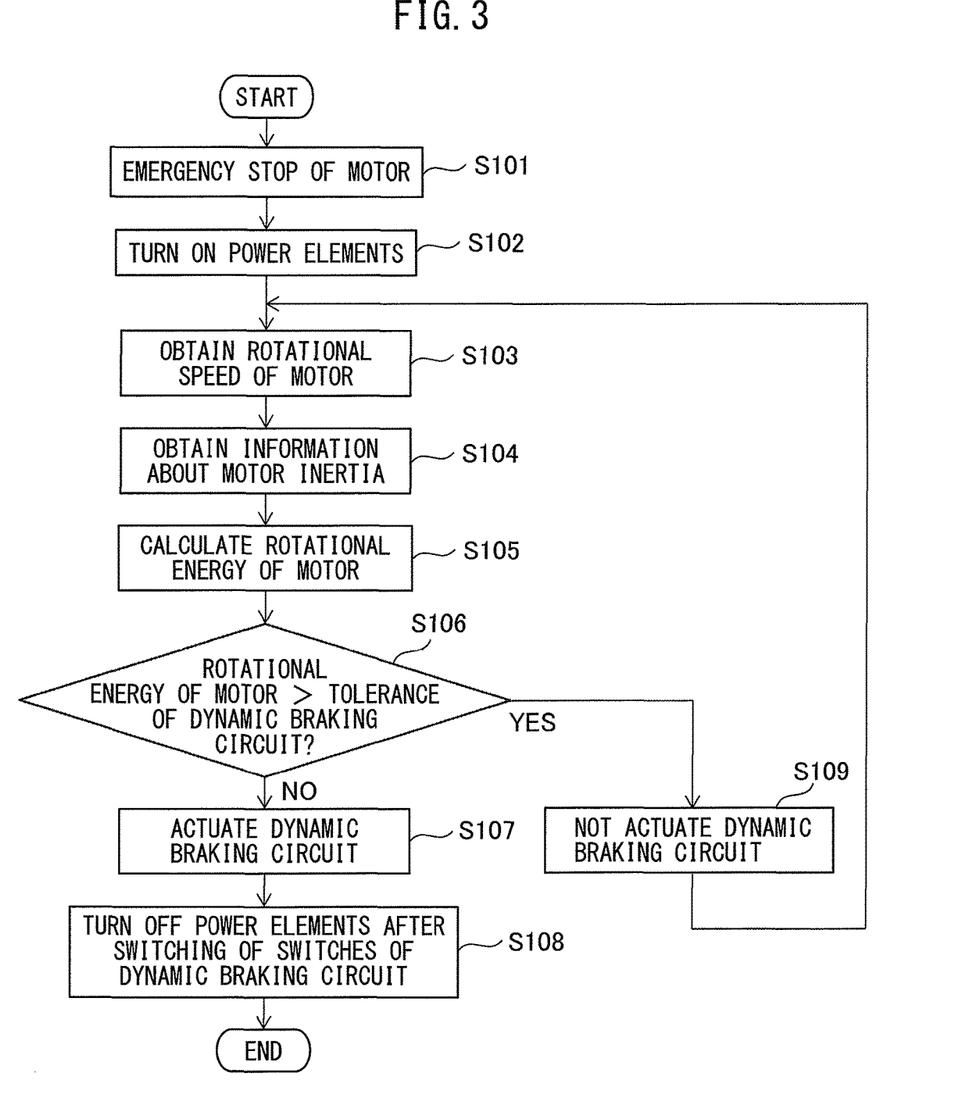
FIG. 3 is a flowchart of the operation of the motor drive according to the embodiment of the present invention.

Next, the operation of the motor drive according to the embodiment of the present invention will be described. FIG. 2 is a timing chart showing variations with time in an emergency stop signal, power element switching commands for the upper and lower arms, the rotational speed of the motor, and a switching control signal for the dynamic braking circuit in the motor drive according to the embodiment of the present invention. FIG. 3 is a flowchart of the operation of the motor drive according to the embodiment of the present invention.

Before an emergency stop of the motor 20, the motor 20 is operated normally. In other words, as shown in FIG. 2, an emergency stop state is being cleared before a time $t_1$. In this case, the inverter 1 alternately turns on and off the power elements of the upper arm 11 and the lower arm 12 to drive the motor 20 (see FIG. 1) at a high rotational speed. At this time, the switches 51 of the dynamic braking circuit 5 are open so as not to operate the dynamic braking circuit 5.

At the time $t_1$, an emergency stop signal is inputted from the outside to the motor drive 101. Accordingly, in step S101, the motor drive 101 stops the motor 20 in an urgent manner.

In step S102, the emergency stop signal is inputted to the power element operation unit 7. The power element operation unit 7 turns on the power elements of one of the upper arm 11 and the lower arm 12, while turning off the power elements of the other arm. For example, as shown in FIG. 2, the power element operation unit 7 turns on the power elements $T_4$, $T_5$, and $T_6$ of the lower arm 12 at the time $t_1$, while turning off the power elements $T_1$, $T_2$, and $T_3$ of the upper arm 11. However, not limited to thereto, the power element operation unit 7 may turn on the power elements $T_1$, $T_2$, and $T_3$ of the upper arm 11 at the time $t_1$, while turning off the upper elements $T_4$, $T_5$, and $T_6$ of the lower arm 12.

Figure 4:
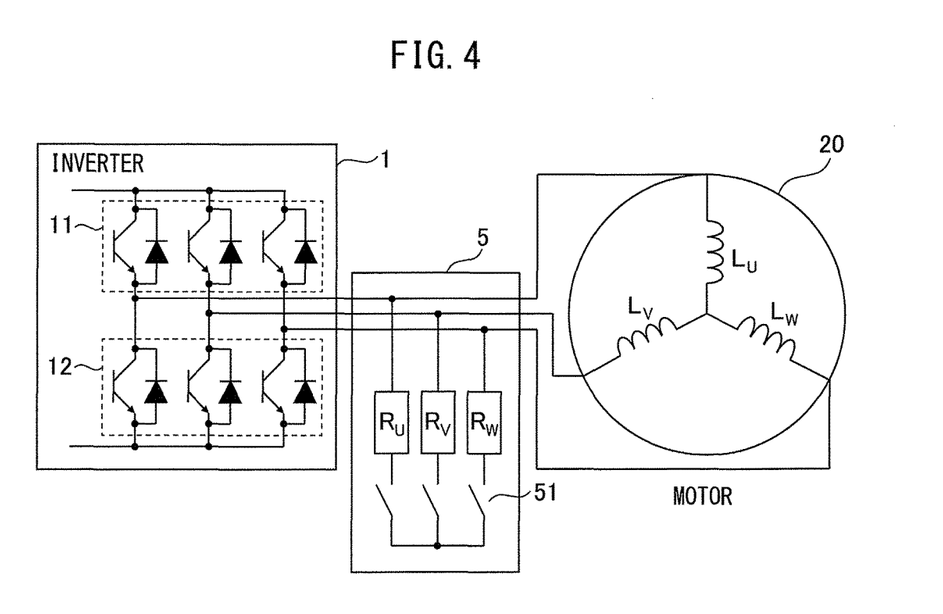
FIG. 4 is a circuit diagram of an inverter, the dynamic braking circuit, and motor windings in the motor drive according to the embodiment of the present invention.

A reduction in the rotational speed of the motor 20 by turning on or off the power elements, without actuating the dynamic braking circuit 5, as described above will be described in detail. FIG. 4 is a circuit diagram of the inverter 1, the dynamic braking circuit 5, and the motor windings $L_U$, $L_V$, and $L_W$ in the motor drive according to the embodiment of the present invention. The windings $L_U$, $L_V$, and $L_W$ of the motor 20 are connected at their terminals to wires each between the power element of the upper arm 11 and the power element of the lower arm 12 of the inverter 1, respectively.

Figure 5:
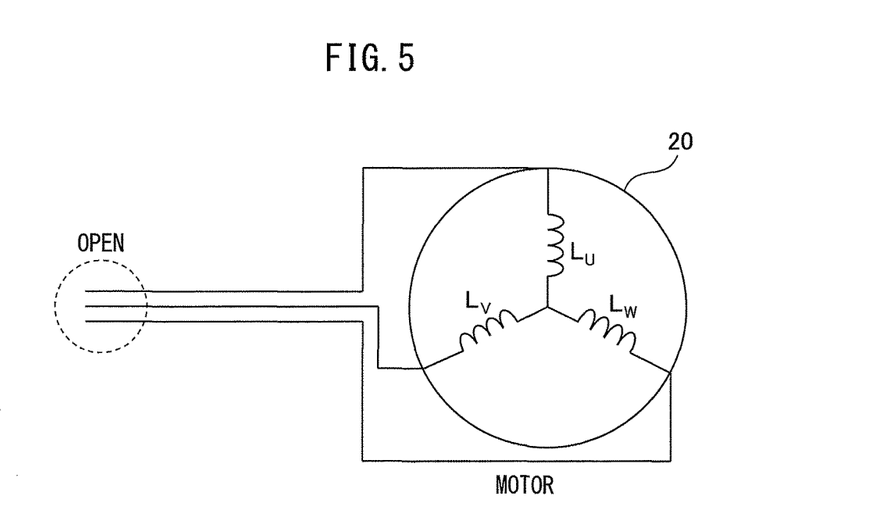
FIG. 5 is a drawing that shows no current flowing through the motor windings, in a state where no power element is turned on, in the motor drive according to the embodiment of the present invention.

When all the power elements of the upper arm 11 and the lower arm 12 are turned off, as shown in FIG. 5, the terminals of the windings $L_U$, $L_V$, and $L_W$ of the motor 20 are in an open state, so no current flows through the windings $L_U$, $L_V$, and $L_W$.

Figure 6:
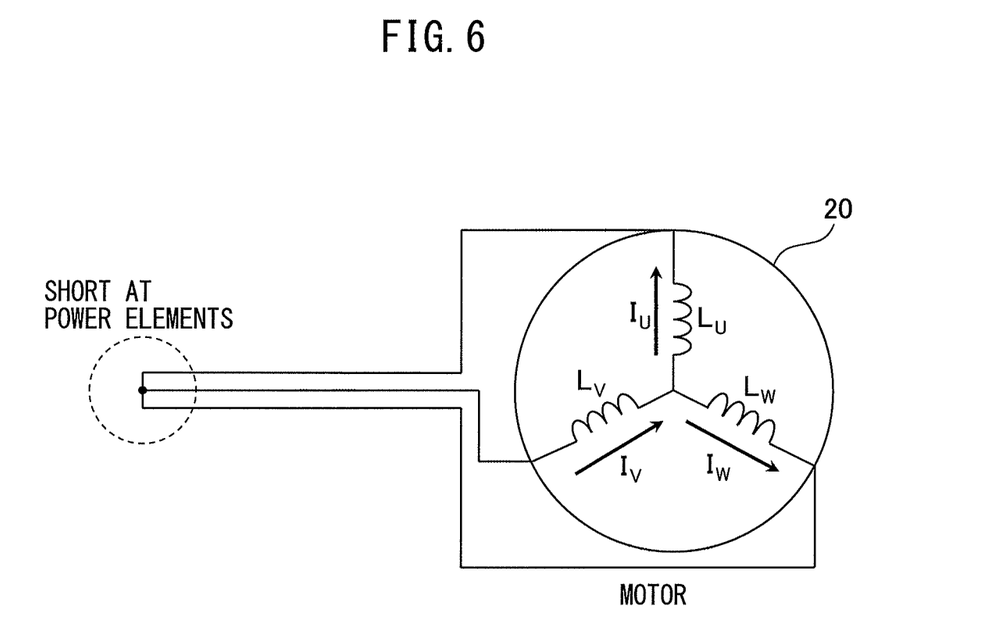
FIG. 6 is a drawing that shows currents flowing through the motor windings, in a state where power elements are turned on, in the motor drive according to the embodiment of the present invention.

On the other hand, when the power elements of one of the upper arm 11 and the lower arm 12 are turned on, as shown in FIG. 6, the terminals of the windings $L_U$, $L_V$, and $L_W$ of the motor 20 are shorted out by the power elements, so currents $I_U$, $I_V$, and $I_W$ flow through the windings $L_U$, $L_V$, and $L_W$, respectively. Since the windings $L_U$, $L_V$, and $L_W$ each include a resistance, the resistances consume the currents $I_U$, $I_V$, and $I_W$ as heat. As a result, the rotational speed of the motor 20 is reduced. As described above, when the dynamic braking circuit 5 is not actuated, the power element operation unit 7 turns on the power elements of one of the arms, in order to hasten a reduction in the rotational energy of the motor 20 through the winding resistances of the motor 20.

Next, in step S103, the rotational speed obtaining unit 2 obtains the rotational speed of the motor 20 and outputs the rotational speed to the rotational energy calculator 4. As described above, upon inputting the emergency stop signal to the motor drive 101, the windings of the motor 20 are shorted out at their terminals by conduction of the power elements. Thus, as shown in FIG. 2, the rotational energy of the motor 20 is gradually reduced.

Next, in step S104, the rotational energy calculator 4 obtains information about the inertia of the motor 20 from the inertia information storage unit 3.

Next, in step S105, the rotational energy calculator 4 calculates the rotational energy of the motor 20 based on the obtained rotational speed of the motor 20 and the information about the inertia of the motor 20.

Next, in step S106, the tolerance comparator 9 determines whether or not the rotational energy of the motor 20 exceeds the tolerance of the dynamic braking circuit 5.

When the tolerance comparator 9 has determined that the rotational energy of the motor 20 exceeds the tolerance of the dynamic braking circuit 5, in step S109, the dynamic braking circuit operation unit 8 does not actuate the dynamic braking circuit 5. After that, the operation of the step S103 to the step S106 is repeated.

When the tolerance comparator 9 has determined that the rotational energy of the motor 20 is equal to or less than the tolerance of the dynamic braking circuit 5, in step S107, the dynamic braking circuit operation unit 8 actuates the dynamic braking circuit 5. That is, as shown in FIG. 2, the rotational speed of the motor 20 is reduced at a time $t_2$ to a level where the dynamic braking circuit 5 can be actuated. At this time, the tolerance comparator 9 determines that the rotational energy of the motor 20 is equal to or less than the tolerance of the dynamic braking circuit 5, and informs the dynamic braking circuit operation unit 8 of the determination. Upon receiving the information, the dynamic braking circuit operation unit 8 actuates the dynamic braking circuit 5. As a result, the rotational speed of the motor 20 is reduced to approximately zero at a time $t_3$.

After that, in step S108, the power elements are turned off after the switching of the switches 51 of the dynamic braking circuit 5. In this manner, when actuating the dynamic braking circuit 5, the power element operation unit 7 turns off the power elements of the one of the arms, after the completion of the switching of the switches 51 of the dynamic braking circuit 5. This serves to prevent wear of contacts of the switches due to chattering. A method for preventing the chattering will be described later.

The above description describes a case in which the initial rotational energy of the motor exceeds the tolerance of the dynamic braking circuit, but the present invention is not limited to this example. That is, the initial rotational energy of the motor may be equal to or less than the tolerance of the dynamic braking circuit. In such a case, the dynamic braking circuit may be actuated upon receiving the emergency stop signal.

Figure 7:
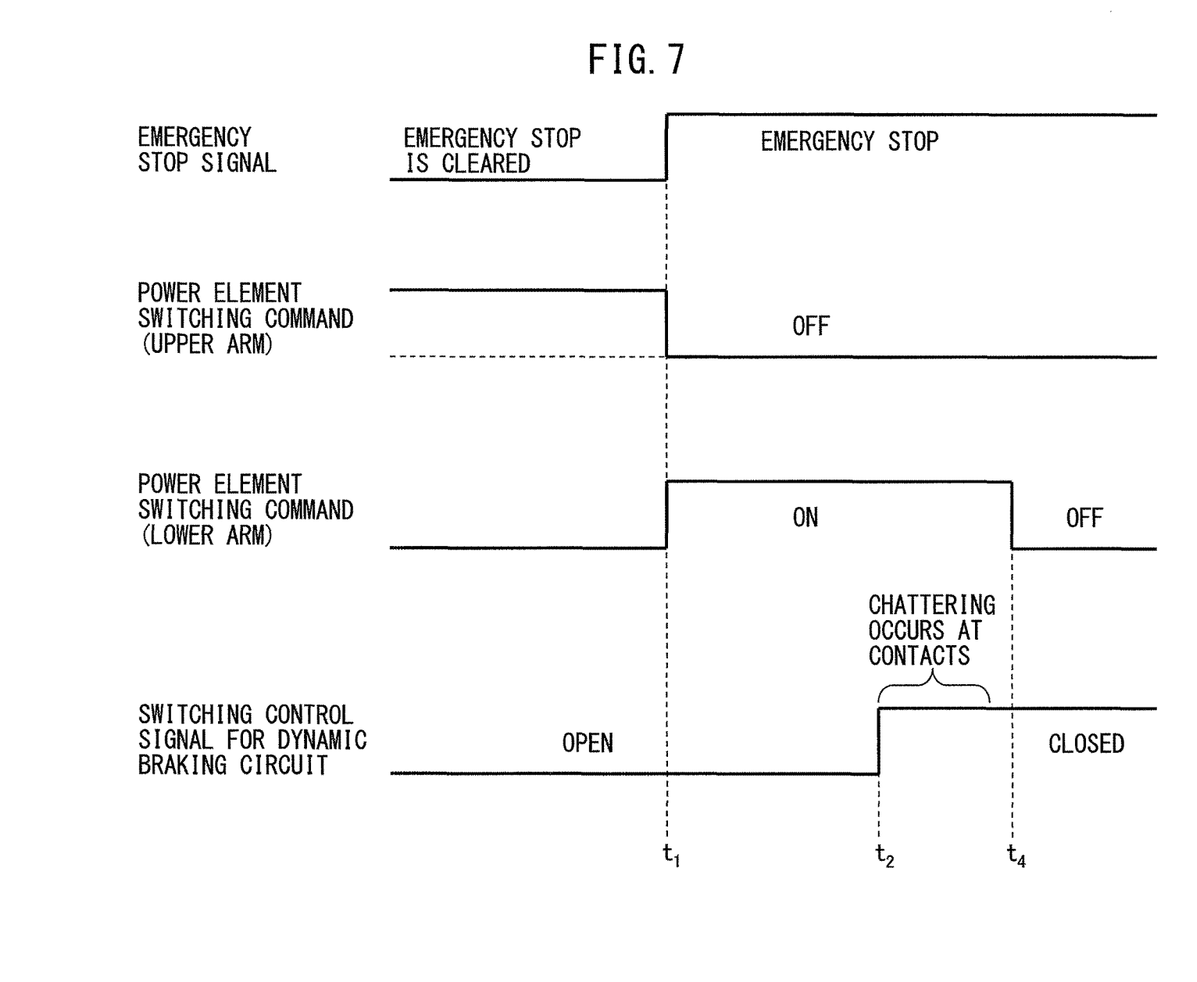
FIG. 7 is a timing chart showing variations with time in the emergency stop signal, the power element switching commands for the upper and lower arms, and the switching control signal for the dynamic braking circuit in the motor drive according to the embodiment of the present invention.

Next, a method for preventing chattering will be described. FIG. 7 is a timing chart showing variations with time in an emergency stop signal, power element switching commands for the upper and lower arms, and a switching control signal for the dynamic braking circuit in the motor drive according to the embodiment of the present invention. An emergency stop signal is inputted at a time $t_1$, and the power elements of the lower arm 12 are turned on. In this state, when the switches of the dynamic braking circuit 5 are switched from an open state to a closed state at a time $t_2$, the switches 51 wobble between an on state and an off state. This is a phenomenon called chattering. After the chattering occurs for a certain period of time, the contacts stably make contact with each other and at last settle into the closed state. When the switches are intended to be closed under application of a high voltage between the contacts of the switches, a discharge may occur between the contacts of the switches due to chattering.

In this embodiment, the power elements of one of the arms are maintained in an on state, after the switches 51 of the dynamic braking circuit 5 are switched to the closed state at the time $t_2$ until chattering between the contacts settles down. After that, when the chattering settles down after a lapse of a certain period of time, the power elements that have been turned on are turned off at a time $t_4$. Therefore, it is possible to prevent the occurrence of a spark by closing the contacts, thus preventing the contacts from being welded, worn, and the like.

The motor drive according to the embodiment of the present invention determines whether or not to actuate the dynamic brake by a comparison between the rotational energy calculated from the rotational speed of the motor and the tolerances of the resistors of the dynamic braking circuit, thus serving to prevent damage to the dynamic braking circuit.

What is claimed is:

1. A motor drive comprising:
   an inverter including power elements constituting an upper arm and a lower arm, for converting a direct current voltage into an alternating current voltage to drive a motor by switching of the power elements;
   a rotational speed obtaining unit for obtaining the rotational speed of the motor during operation of the motor;
   an inertia information storage unit for storing information about the inertia of the motor;
   a dynamic braking circuit including switches for shorting a plurality of windings provided in the motor through resistors, for generating a deceleration torque by dynamic braking of the motor in case of an emergency stop of the motor;
   a rotational energy calculator for calculating the rotational energy of the motor when the dynamic braking circuit switches are open and the dynamic braking circuit is deactivated, the rotational energy of the motor calculated based on the obtained rotational speed of the motor and the inertia of the motor;
   a tolerance information storage unit for storing information about the tolerances of the resistors of the dynamic braking circuit;
   a power element operation unit for turning on the power elements of one of the upper and lower arms, while turning off the power elements of the other arm in the emergency stop of the motor;
   a dynamic braking circuit operation unit for operating the switches of the dynamic braking circuit; and
   a tolerance comparator for performing a comparison between the calculated rotational energy of the motor and the tolerance of the dynamic braking circuit, wherein
   when the rotational energy of the motor exceeds the tolerance of the dynamic braking circuit, the dynamic braking circuit operation unit turns on the power elements of one of the upper and lower arms, while turning off the power elements of the other arm, when the dynamic braking circuit switches are open and the dynamic braking circuit is deactivated, and
   when the rotational energy of the motor is equal to or less than the tolerance of the dynamic braking circuit, the dynamic braking circuit operation unit closes at least one of the dynamic braking circuit switches to actuate the dynamic braking circuit, and the power element operation unit turns off the power elements of the one of the upper and lower arms.

2. The motor drive according to claim 1, wherein when the dynamic braking circuit is not actuated, the power element operation unit turns on the power elements of the one of the upper and lower arms in order to accelerate a reduction in the rotational energy of the motor through winding resistances of the motor.

3. The motor drive according to claim 1, wherein when the dynamic braking circuit is actuated, the power element operation unit turns off the power elements of the one of the upper and lower arms, after the completion of switching of the switches of the dynamic braking circuit, in order to prevent wear of contacts of the switches due to chattering.

* * * * *